(12) United States Patent
Ejderklint et al.

(10) Patent No.: US 7,410,331 B2
(45) Date of Patent: Aug. 12, 2008

(54) TOOL

(75) Inventors: Christer Ejderklint, Fagersta (SE);
Bertrand Riviere, Bourges (FR);
Dominique Meyer, Berry-Bouy (FR)

(73) Assignee: Seco Tools AB, Fagersta (SE)

( * ) Notice: Subject to any disclaimer, the term of this patent is extended or adjusted under 35 U.S.C. 154(b) by 160 days.

(21) Appl. No.: 11/427,354

(22) Filed: Jun. 29, 2006

(65) Prior Publication Data
US 2008/0003067 A1   Jan. 3, 2008

(51) Int. Cl.
*B23C 5/06*  (2006.01)
*B23B 27/16*  (2006.01)

(52) U.S. Cl. .................. 407/113; 407/114; 407/115

(58) Field of Classification Search .............. 407/107, 407/113, 114, 115, 116
See application file for complete search history.

(56) References Cited

U.S. PATENT DOCUMENTS

| | | | | |
|---|---|---|---|---|
| 4,993,892 A | * | 2/1991 | Takahashi | 407/114 |
| 5,004,380 A | * | 4/1991 | Hessman et al. | 407/114 |
| 5,046,899 A | | 9/1991 | Nishi | |
| 5,536,119 A | * | 7/1996 | Werner et al. | 407/36 |
| 5,947,650 A | * | 9/1999 | Satran et al. | 407/113 |
| 6,053,672 A | | 4/2000 | Satran et al. | |
| 2003/0005803 A1 | | 1/2003 | Satran et al. | |

OTHER PUBLICATIONS

International Search Report from corresponding International Application No. PCT/SE2006/000777.

* cited by examiner

*Primary Examiner*—Willmon Fridie, Jr.
(74) *Attorney, Agent, or Firm*—WRB-IP LLP

(57) ABSTRACT

In a cutting insert and a milling tool, where the cutting insert is to be on-edge mounted to the tool, the cutting insert includes a polygonal body of wear resistant material. The body includes a first side surface and a second side surface opposing one another and therebetween a number of end surfaces. The intersection of two end surfaces form a cutting edge at a corner portion. The first side surface is substantially planar and the second side surface connects to raised portions at corner portions. The first side surface is greater than the second side surface.

15 Claims, 8 Drawing Sheets

TOOL

BACKGROUND AND SUMMARY

The present invention relates to a cutting insert, a milling tool and a milling body. The present application is adapted from SE 0501486-5, filed Jun. 22, 2005, which is incorporated by reference.

At slot-milling cutters, the periphery of the milling body is equipped with a number of cutting inserts, every second one of which protrudes in relation to one side of the milling body and every second from the opposite side of the milling body. The relative displacement of the cutting inserts is made in order to obtain clearance and in order to obtain slots having perpendicular or parallel bordering surfaces. The bottom surface of the slot is cut by means of the major cutting edges of the cutting inserts while the side surfaces of the slot are cut by means of the minor cutting edges extending substantially perpendicularly to the major cutting edges. Radii between the bottom surface and the side surfaces are obtained by means of more or less rounded cutting corners at a transition between associated pairs of major and minor cutting edges of each cutting insert. The relative displacement requires that the cutting inserts are formed in particular right hand and left hand embodiments in order to guarantee the requisite clearance between the side wall and the portion of the cutting insert following after the minor cutting edge.

Through EP-A-0 873 808 a single sided cutting insert is previously known, which comprises only two, but different, cutting edges, which should not be possible mix-up by the operator. The known cutting insert means poor utilization of the possibilities of the cutting material. In U.S. Pat. No. 5,454,671, another single sided cutting insert is shown. A double sided slot milling insert is shown in U.S. Pat. No. 5,004,380 having wear reducing lands.

It is desirable to provide a single sided cutting insert for a wide variety of widths of the slots.

It is desirable to provide an easy-cutting single sided cutting insert.

It is desirable to provide a cutting insert, the geometry of which permits that varying corner shapes such as radius, chamfer, wiper or other shapes can be formed thereon.

It is desirable to provide a milling tool and a cutting insert providing a planar bottom surface in the slot.

It is desirable to provide a milling body and a cutting insert directing the chips away from the generated surface of the slot.

BRIEF DESCRIPTION OF THE DRAWINGS

Preferred embodiments of the present invention are described more closely in the following in connection with the accompanying drawing figures, in which.

DETAILED DESCRIPTION OF EMBODIMENTS OF THE INVENTION

Figure 1A:
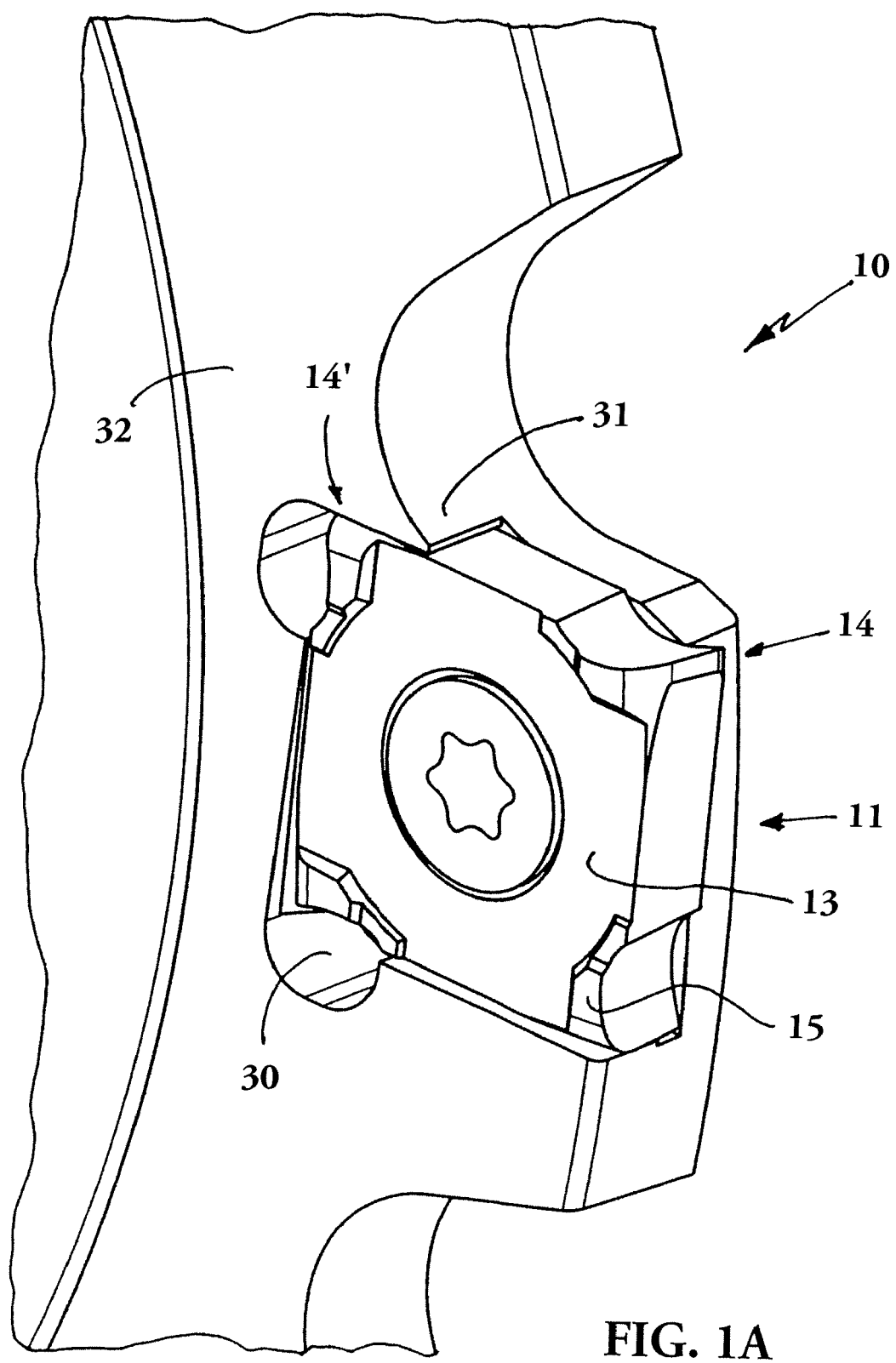
FIG. 1A is a perspective view of a part of a milling tool according to the present invention and one embodiment of an insert according to the present invention.
Figure 1C:
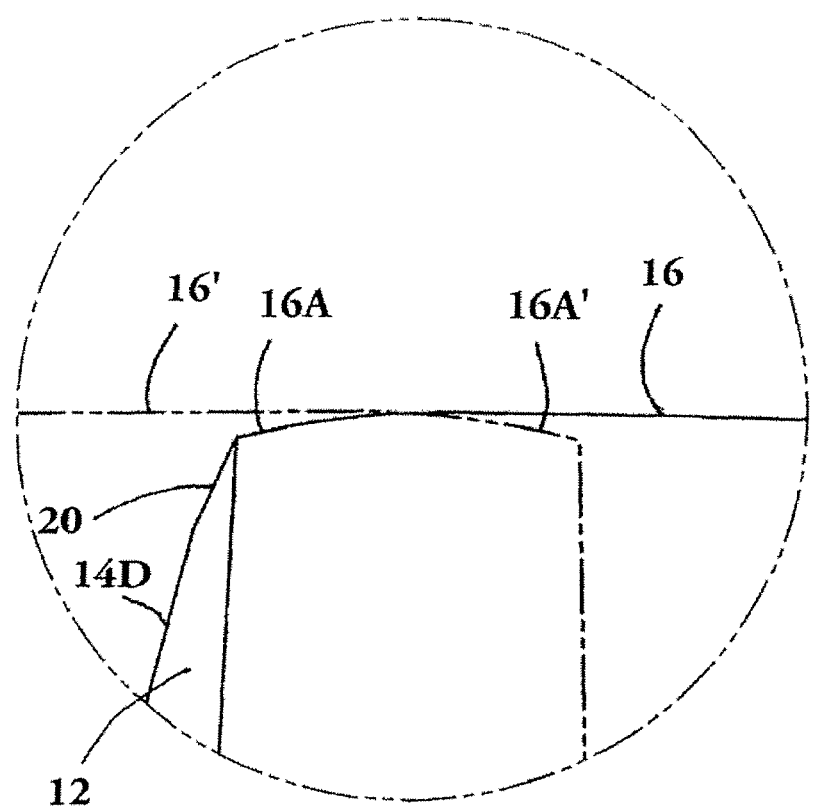
FIG. 1C shows an enlarged portion of the milling insert as shown by the dashed circle in FIG. 1B.
Figure 1B:
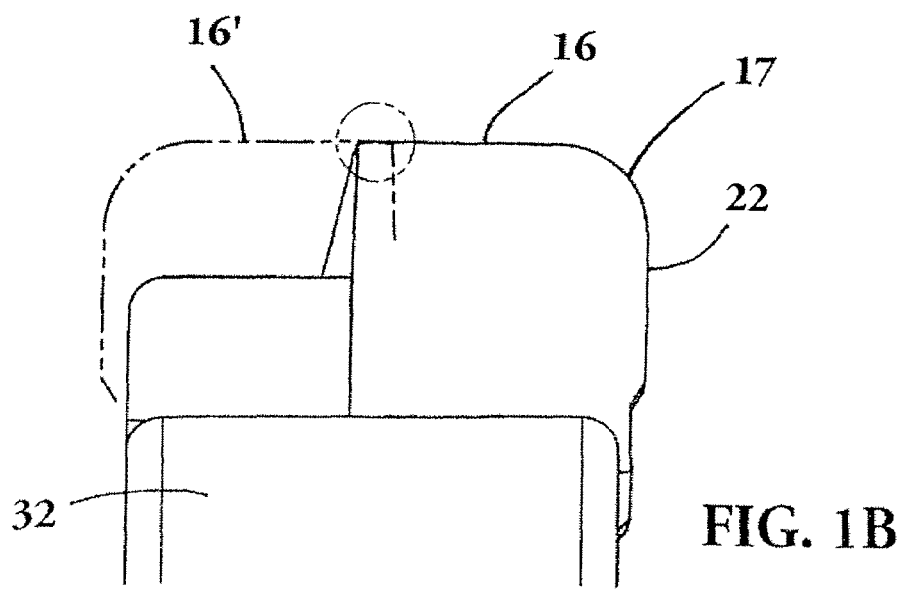
FIG. 1B partially shows the milling insert according to the present invention mounted to the milling tool.
Figure 2A:
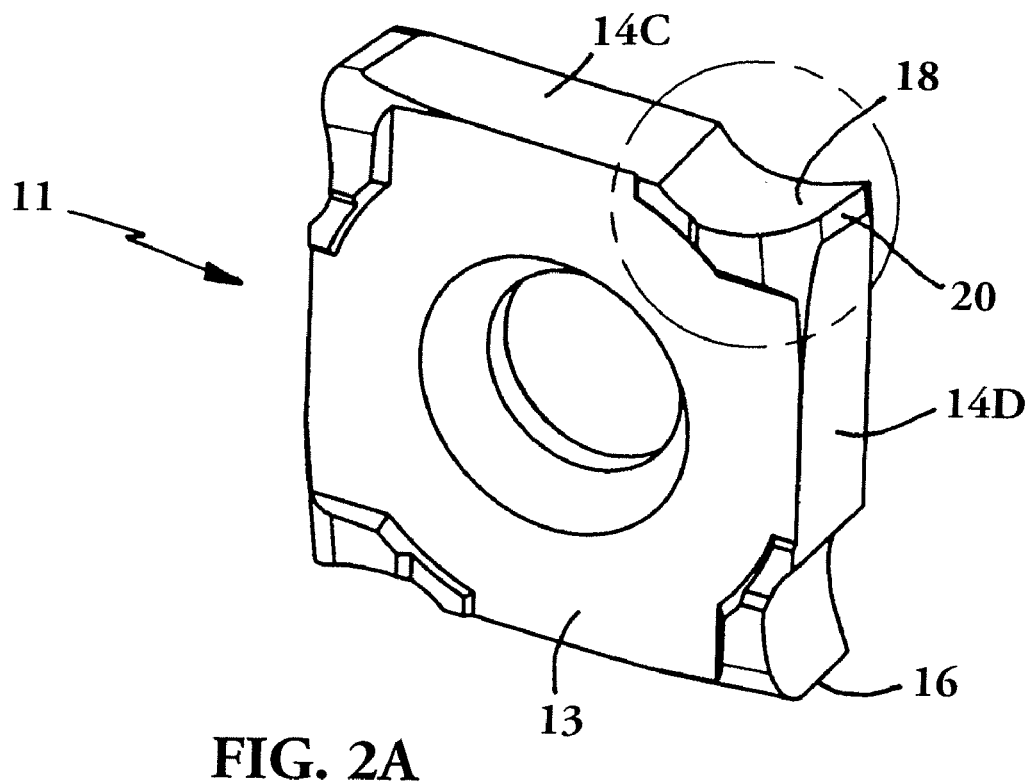
FIG. 2A is a perspective view of the milling insert shown in FIG. 1A.
Figure 2D:
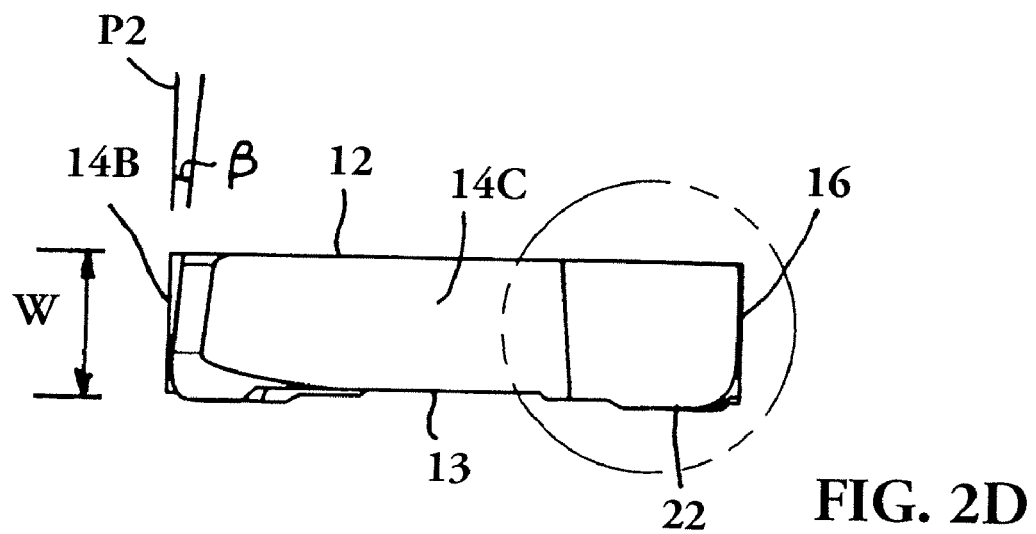
FIG. 2D is a front view of the insert shown in FIG. 2B.
Figure 2C:
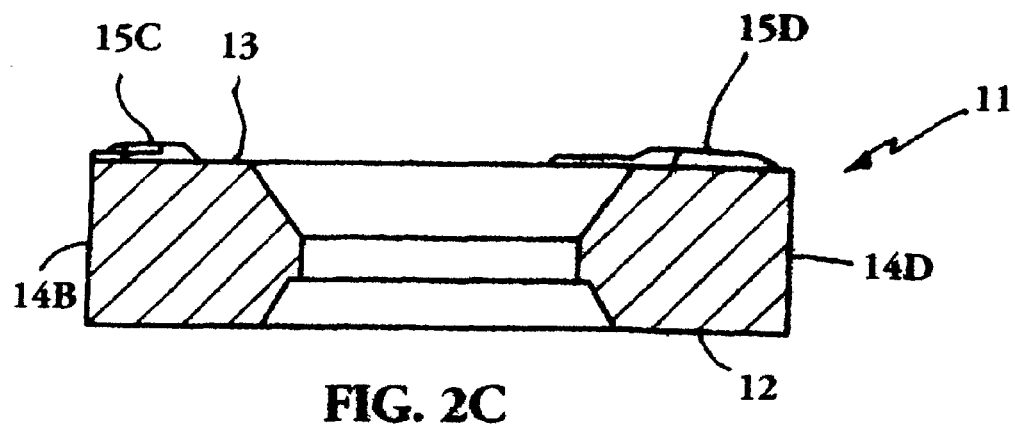
FIG. 2C is a cross-sectional view along the line C-C in FIG. 2B.
Figure 2B:
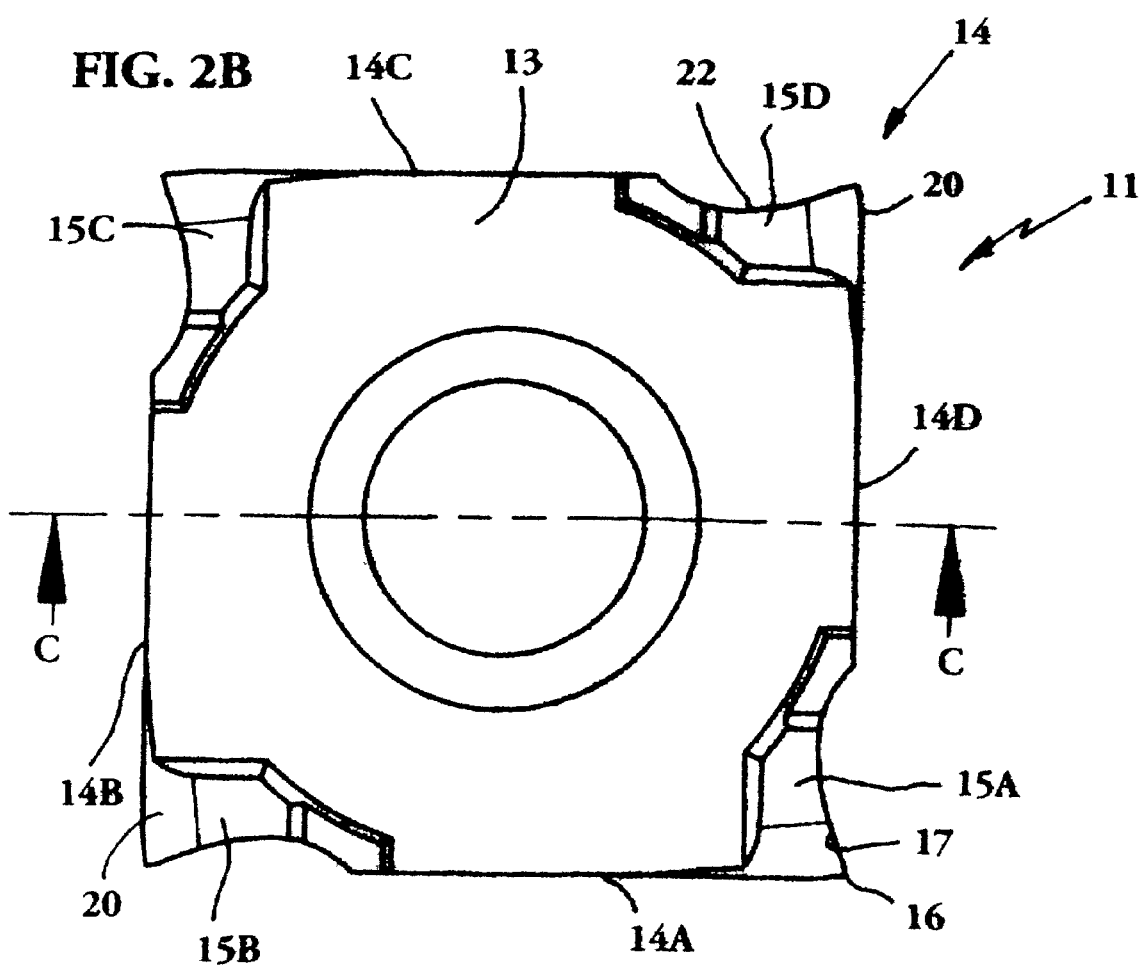
FIG. 2B is a plan view of the insert according to the invention.
Figure 2F:
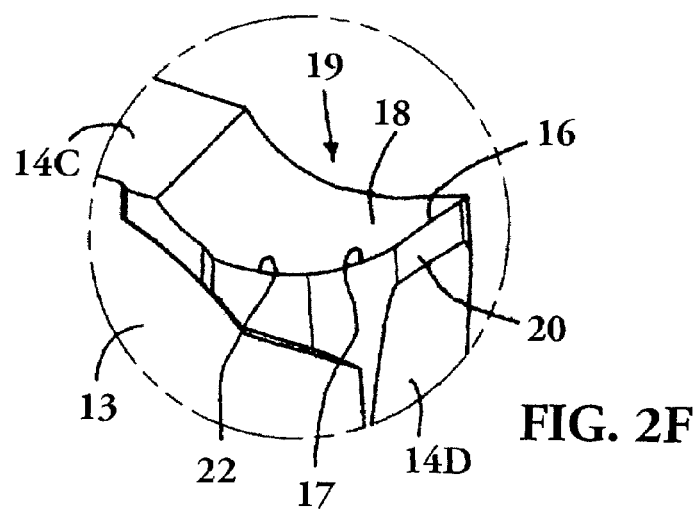
FIG. 2F shows an enlarged portion of the milling insert as shown by the dashed circle in FIG. 2A.
Figure 2G:
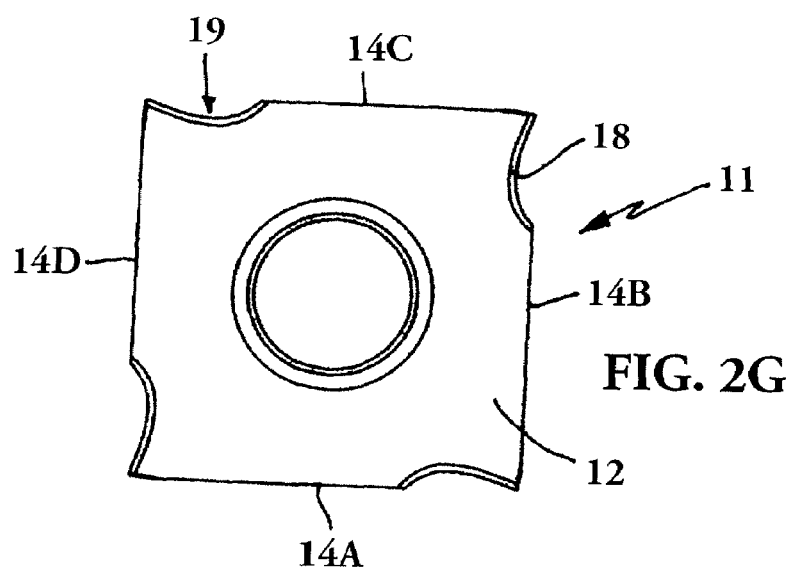
FIG. 2G shows a rear view of the milling insert.
Figure 2E:
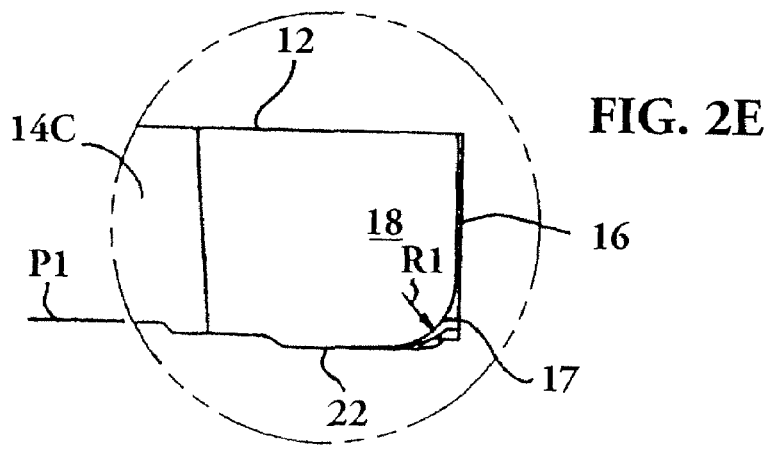
FIG. 2E shows an enlarged portion of the milling insert as shown by the dashed circle in FIG. 2D.

FIGS. 1A-1C shows a part of a slot-milling tool 10 according to the present invention and FIGS. 2A-2G shows a slot-milling or cutting insert 11 according to the present invention. The replaceable cutting insert 11 is on-edge mounted in a pocket at the periphery of a slot-milling body 32. The cutting insert 11 comprises a polygonal body of wear resistant material. The body includes a first side surface 12 and a second side surface 13 opposing one another and a number of end surfaces 14A-14D extending therebetween. The intersection of two of the end surfaces forms a cutting edge. The cutting corners 14 of the cutting insert 11 are all identical in this embodiment. The insert 11 is provided with a central hole to receive a clamping screw. The hole intersects the first side surface 12 and the second side surface 13. Each cutting corner is provided with a first cutting edge 16 and a second cutting edge 17. The cutting insert 11 may be comprised of a polygonal body of wear-resistant material of a plate of sintered, preferably coated, cemented carbide, in this case a square basic shape in the view according to FIG. 2B. The two side surfaces 12, 13 are substantially parallel and both extend to end surfaces 14A-14D. The first side surface 12 is substantially planar while the second side surface 13 connects to raised portions 15A-15D at corner portions 14. The raised portions protrude laterally with respect to an imaginary plane P1 containing the second side surface 13 and thus the cutting edge 16 or 17 intersects the plane P1. The raised portions form a relatively small part of the total area of the second side surface 13, i.e. less than 30%. The lateral distance between the second side surface 12 and the raised portions 15A-15D determines the greatest width W of the cutting insert 11. A typical value of the width W is 3 to 4 mm. The cutting insert 11 has a negative basic shape since the end surfaces 14A-14D are substantially perpendicular to the side surfaces 12, 13. All corners portions are identical and all raised portions 15A-15D are identical in this embodiment, and therefore substantially only one of the corner portions is discussed hereinafter. The corner portion comprises the first cutting edge 16 and the second cutting edge 17. The first cutting edge 16 extends at an acute angle β to a line perpendicular to the first side surface 12 or to a plane P2 containing the end surface 14B (as illustrated by FIG. 2D). The angle β is chosen within the interval 3 to 9°, such as 4 to 5°. The first cutting edge 16 transits mathematically smooth into the second cutting edge 17, i.e., the first and second cutting edges are continuous. The second cutting edge 17 substantially follows a curved convex path from where it is connected to the first cutting edge 16. The path of the second cutting edge 17 is defined by a radius R1, the origin of which is situated on a line parallel to the first side surface 12. The second cutting edge is defined by the radius R1 in a circle segment about 90°. In this embodiment the second cutting edge 17 tangentially joins a third cutting edge 22 (as illustrated by FIG. 2E) that diverges from the plane P1 at a small angle and that extends to the greatest width W of the insert 11. Then the third cutting edge 22 connects to the second side surface 13 via two steps. The cutting edges 16, 17 connects to a rake face 18. The rake face 18 in this embodiment is positioned at least partly in a plane that slopes downwardly and inwardly from the first cutting edge 16 at an acute angle of about 20° to reduce cutting forces. The rake face 18 slopes from at least the forward part of the second cutting edge 17 in a similar manner. The rake face 18 forms a part of a concave recess 19 in the end surface. The recess 19 directs chips away from the generated surface. A clearance face 20 trails the cutting edges 16,17 when considering the working direction of the slot-milling tool. The clearance face 20 has a generally greater extension behind the second cutting edge 17 than behind the first cutting edge 16. In this embodiment the clearance face 20 extends a distance towards a trailing protrusion.

The cutting edges 16, 17 of each cutting insert 11 at one side of the slot milling tool are provided to cut away about one half of the material in the slot.

Referring especially to FIGS. 1A, 1B and 1C each cutting insert 11 is positioned in a pocket 30 having three shoulders and a base surface. The cutting insert 11 rests with its first side surface 12 against the base surface. The base surface is angled within the interval 3 to 9°, such as 4 to 5°, such that its axial depth increases in direction radially inwardly. Thereby the cutting edge 16 and a trailing cutting edge 16' of another insert (as illustrated by a dashed line in FIGS. 1B and 1C) will become parallel to the rotational axis of the slot-milling tool to achieve a smooth or straight slot bottom. As illustrated in FIG. 1C the cutting edge 16 connects to the lower surface 12 via a curved edge portion 16A, 16A' so as to provide smooth transfers between the edges 16 and 16' during slotting.

The shoulders of the pocket in this embodiment are substantially perpendicular to the base surface. Each shoulder is substantially perpendicular to the adjacent shoulder. Adjacent shoulders are separated by a recess fulfilling the objects of providing clearance for a pocket milling tool and subsequently providing clearance for the cutting edges 16, 17 and 22. The shoulder 31 that is closest to the active cutting corner 14 usually does not have a supporting function but rather is provided to deflect chips and debris to avoid damage to a passive cutting corner 14'.

Figure 3A:
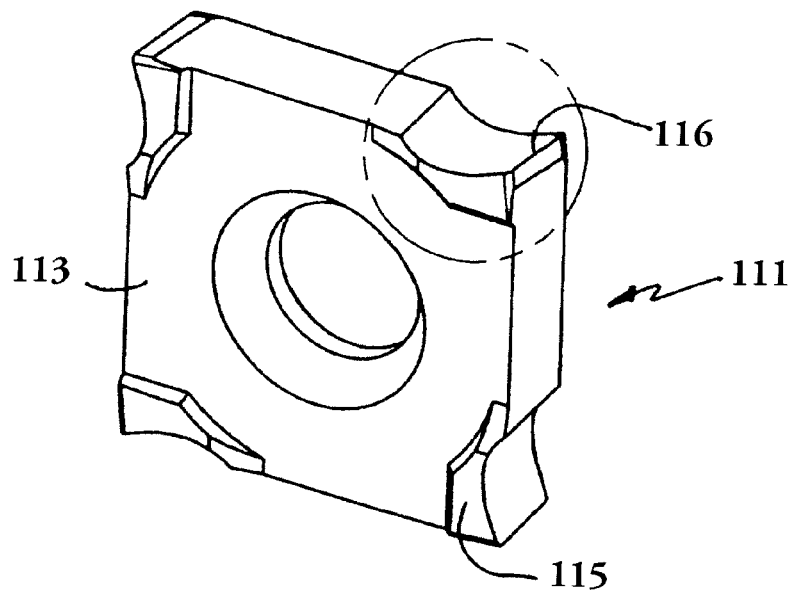
FIG. 3A is a perspective view of a milling insert according to an alternative embodiment of the present invention.
Figure 3B:
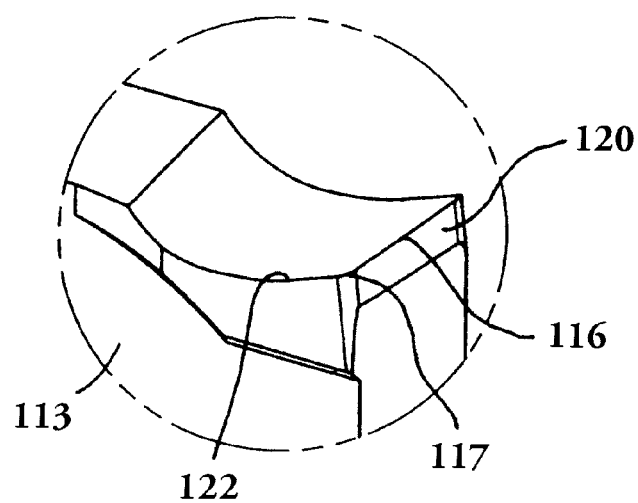
FIG. 3B shows an enlarged corner portion of the milling insert as shown by the dashed circle in FIG. 3A.
Figure 3C:
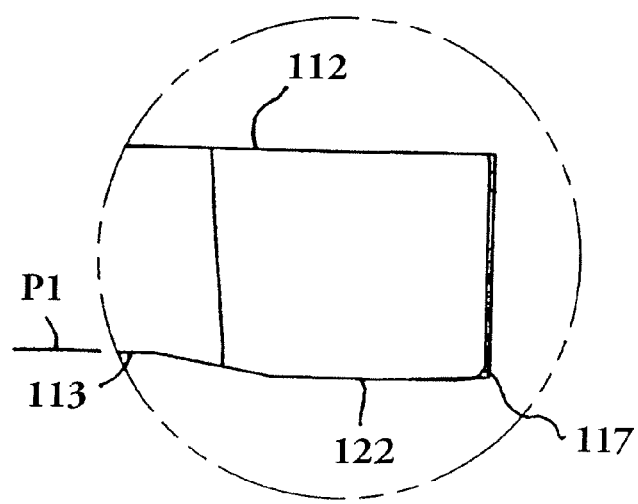
FIG. 3C shows an enlarged corner portion of the milling insert in a front view.

FIGS. 3A-3C show an alternative embodiment of a milling insert 111 according to the invention. This embodiment differs from the one previously presented above substantially regarding the periphery of the raised portions 115 and regarding the extension of the clearance faces 120. The first cutting edge 116 here extends over the major part of the width of the cutting insert 111. The second cutting edge 117 is situated beyond the plane P1 with respect to an imaginary midline of the insert 111 and is defined by a small radius in comparison with the radius R1. The clearance face 120 has a generally greater extension behind the second cutting edge 117 than behind the first cutting edge 116 but each clearance face is spaced from the adjacent trailing raised portion 115. In this embodiment the second cutting edge 117 joins a slightly convex third cutting edge 122 (as illustrated by FIG. 3C) that diverges from the plane P1 and that extends to the greatest width W of the insert 111. Then the third cutting edge 122 connects to the second side surface 113 via a substantially straight transition.

Figure 4A:
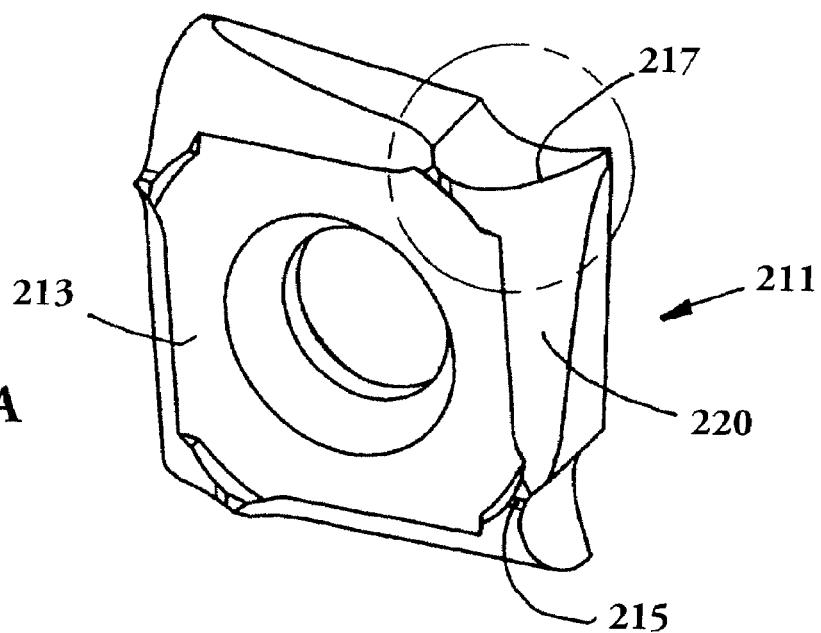
FIG. 4A shows another alternative embodiment of a milling insert according to the invention in a perspective view.
Figure 4B:
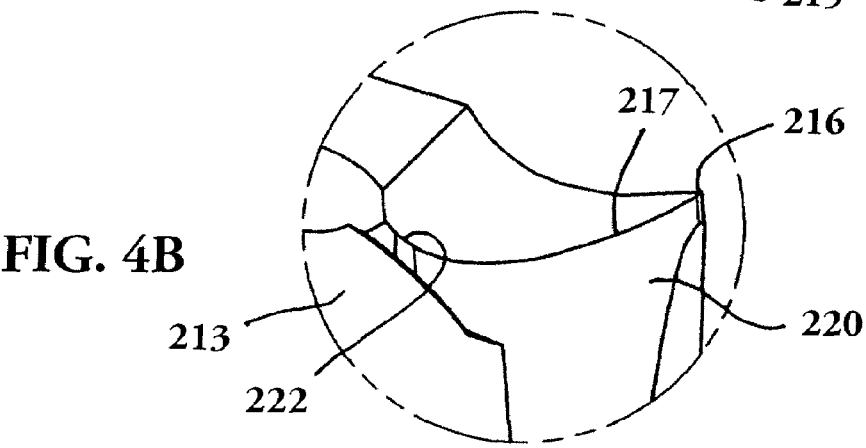
FIG. 4B shows an enlarged corner portion of the milling insert as shown by the dashed circle in FIG. 4A.
Figure 4C:
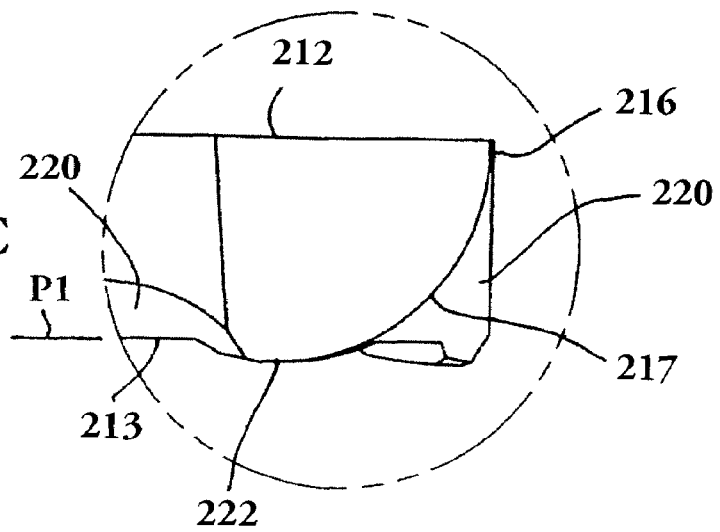
FIG. 4C shows an enlarged corner portion of the milling insert in a front view.

FIGS. 4A-4C show an another alternative embodiment of a milling insert 211 according to the invention. This embodiment differs from the previously presented embodiments substantially regarding the periphery of the raised portions 215 and regarding the extension of the clearance faces 220. The first cutting edge 216 here extends over a minor part of the width of the cutting insert 211. The second cutting edge 217 extends over the major part of the width of the cutting insert 211 and intersects the plane P1. The second cutting edge 217 is defined by a larger radius in comparison with the radius R1 and greater than the radius disclosed in FIG. 2E. The clearance face 220 has a generally greater extension behind the second cutting edge 217 than behind the first cutting edge 216. The clearance face 220 reaches into the adjacent trailing raised portion 215. In this embodiment the second cutting edge 217 joins a third cutting edge 222 that diverges from the plane P1 and that extends to the greatest width W of the insert 211. Then the third cutting edge 222 connects to the second side surface 213 via a concave transition.

Milling of narrow slots with an insert according to the present invention has the advantages of providing a single sided cutting insert for a wide variety of widths of slots and having four cutting corners, providing an easy-cutting single sided cutting insert, providing a cutting insert, the basic geometry of which permits that varying corner shapes such as radius, chamfer, wiper edges or other shapes can be formed thereon, providing a milling tool that cuts a straight bottom surface in the slot, and providing a milling body and a cutting insert directing the chips away from the generated surface of the slot. It should be understood that the shown insert embodiments are to be mounted on one side of the mid plane of the milling tool and that a mirror-imaged milling insert is positioned at the other side of the mid plane.

Figure 5A:
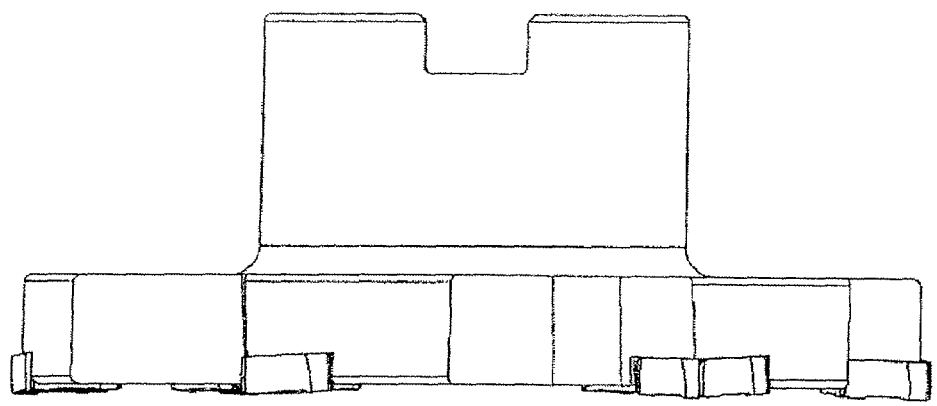
FIGS. 5A and 5B show two alternative shoulder milling tools according to the present invention.
Figure 5B:
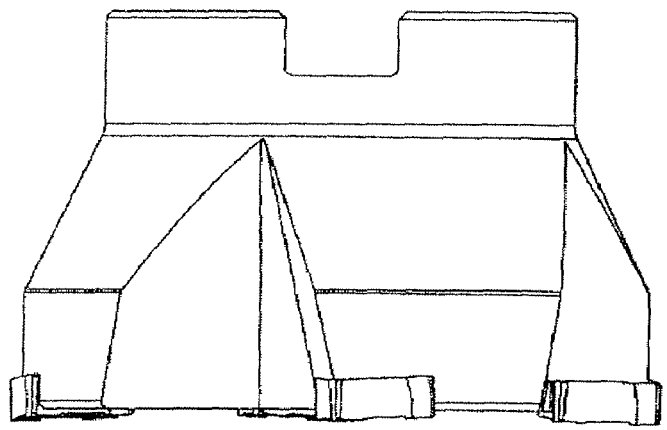

According to another aspect of the present invention each of the disclosed cutting insert according to the present invention can be used for face and/or shoulder milling. FIGS. 5A and 5B show two alternative shoulder milling tools according to the present invention, each having a setting angle being about 90°.

Figure 6:
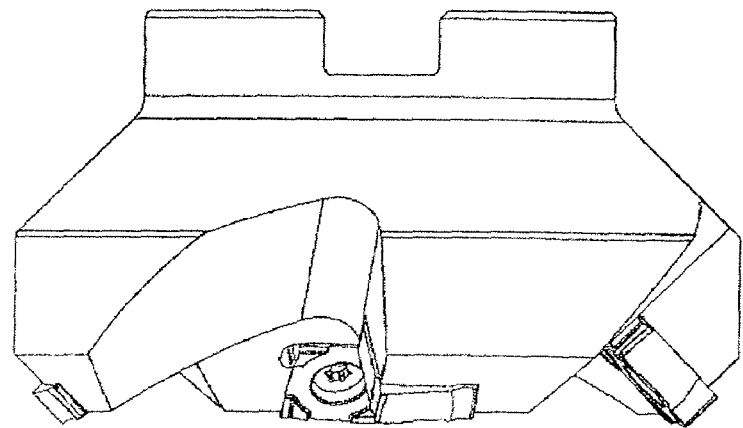
FIG. 6 shows another alternative milling tool according to the present invention.

According to yet another aspect of the present invention each of the disclosed cutting inserts according to the present invention can be used for face milling. FIG. 6 shows a milling tool according to the present invention having a setting angle being not 90°, e.g. 45°.

Milling surfaces by using an insert according to the present invention has the advantages of providing a single sided cutting insert for a wide variety of widths of slots and having four cutting corners, providing an easy-cutting single sided cutting insert, providing a cutting insert, the basic geometry of which permits that varying corner shapes such as radius, chamfer, wiper edges or other shapes can be formed thereon, and providing a cutting insert directing the chips away from the generated work piece surface.

The lower surface 12, 112 and 212, respectively, of the cutting insert according to the present invention is substantially identical in all shown embodiments. All shown insert embodiments can for example be ground from a single blank.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A replaceable cutting insert to be on-edge mounted to a tool, the cutting insert comprising a polygonal body of wear resistant material, the body including a first side surface and a second side surface opposing one another and therebetween a number of end surfaces, an intersection of two end surfaces extending between the first side surface and the second side surface forming a cutting edge at a corner portion, the cutting edge extending between the first side surface and the second side surface, the cutting insert being provided with a central hole to receive a clamping device, the hole intersecting the first side surface and the second side surface, wherein the first side surface is substantially planar, the second side surface connects to raised portions at corner portions, and the first side surface is larger than the second side surface.

2. The insert according to claim 1, wherein a greatest width of the cutting insert is between the raised portions and the first side surface and the cutting edge intersects a plane containing the second side surface.

3. The insert according to claim 2, wherein the corner portion comprises a first cutting edge and a second cutting edge and the first cutting edge extends at an acute angle to a line perpendicular to the first side surface or to a plane containing an end surface.

4. The insert according to claim 3, wherein the acute angle is within the interval 3 to 9°.

5. The insert according to claim 3, wherein the acute angle is chosen within the interval 4 to 5°.

6. The insert according to claim 3, wherein the first cutting edge is continuous with the second cutting edge.

7. The insert according to claim 3, wherein a clearance face trails the cutting edges, the clearance face having a generally greater extension behind the second cutting edge than behind the first cutting edge.

8. The insert according to claim 1, wherein the cutting edge connects to a rake face, the rake face being positioned at least partly in a plane that slopes downwardly and inwardly from the first cutting edge at an acute angle.

9. The insert according to claim 8, wherein the rake face forms a part of a concave recess in the end surface.

10. The insert according to claim 1, wherein the corner portion comprises a first cutting edge and a second cutting edge and the first cutting edge extends at an acute angle to a line perpendicular to the first side surface or to a plane containing an end surface.

11. The insert according to claim 10, wherein the acute angle is within the interval 3 to 9°.

12. The insert according to claim 10, wherein the acute angle is chosen within the interval 4 to 5°.

13. The insert according to claim 10, wherein the first cutting edge is continuous with the second cutting edge.

14. The insert according to claim 10, wherein a clearance face trails the cutting edges, the clearance face having a generally greater extension behind the second cutting edge than behind the first cutting edge.

15. A milling tool having a milling body, a periphery of the milling body being equipped with at least one cutting insert, the tool comprising at least one pocket, each pocket carrying an on-edge mounted cutting insert according to claim 1.

* * * * *